United States Patent [19]

Savins

[11] 4,305,688
[45] Dec. 15, 1981

[54] TRANSPORTING PARTICULATE SOLID MATERIAL AS A SLURRY THROUGH A PIPELINE

[75] Inventor: Joseph G. Savins, Dallas, Tex.

[73] Assignee: Mobil Oil Corporation, New York, N.Y.

[21] Appl. No.: 122,774

[22] Filed: Feb. 19, 1980

Related U.S. Application Data

[63] Continuation of Ser. No. 874,095, Feb. 1, 1978.

[51] Int. Cl.³ .............................................. B65G 53/30
[52] U.S. Cl. ..................................... 406/197; 406/47; 406/49
[58] Field of Search ...................... 406/46, 49, 197, 47; 44/51

[56]  References Cited
U.S. PATENT DOCUMENTS

| | | | |
|---|---|---|---|
| 827,139 | 7/1906 | Browne et al. | 44/51 |
| 1,431,225 | 10/1922 | Greenstreet | 44/51 |
| 1,447,008 | 2/1923 | Bates | 44/51 |
| 2,090,393 | 8/1937 | Roberts | 44/51 |
| 3,129,164 | 4/1964 | Cameron | 406/197 |
| 3,617,095 | 11/1971 | Lissant | 406/197 |
| 3,637,263 | 1/1972 | Wasp | 406/197 X |
| 3,907,134 | 9/1975 | Metzger | 44/51 |
| 3,926,203 | 12/1975 | Marsden et al. | 137/13 |
| 3,950,034 | 4/1976 | Dreher et al. | 406/197 X |
| 3,968,999 | 7/1976 | Keller | 406/197 |
| 3,996,026 | 12/1976 | Cole | 44/51 X |
| 4,045,092 | 8/1977 | Keller | 44/51 X |
| 4,090,853 | 5/1978 | Clayfield et al. | 44/51 |

FOREIGN PATENT DOCUMENTS 1558969  2/1971  Fed. Rep. of Germany.
741835  3/1974  South Africa.

Primary Examiner—James L. Rowland
Attorney, Agent, or Firm—Charles A. Huggett; James F. Powers, Jr.; Lawrence O. Miller

[57]  ABSTRACT

This specification discloses a method of transporting particulate solid material as a slurry through a pipeline. A pumpable slurry is formed of the particulate solid material in a solution of alcohol and water as a carrier liquid having an additive therein to thicken it. The slurry is pumped through the pipeline to transport the particulate solid material to a desired location.

6 Claims, 2 Drawing Figures

TRANSPORTING PARTICULATE SOLID MATERIAL AS A SLURRY THROUGH A PIPELINE

This is a continuation of copending application Ser. No. 874,095, filed Feb. 1, 1978.

BACKGROUND OF THE INVENTION

This invention is concerned with transporting particulate solid material through a pipeline in the form of a slurry and in particular is concerned with transporting coal through a pipeline in the form of a slurry.

It is well recognized that the amounts of recoverable hydrocarbons in the form of crude oil and natural gases are finite and shortages thereof have been experienced. Much consideration has been given to using coal as a substitute for crude oil and natural gas. Large reserves of coal are known to exist in this country. Many of these reserves, however, are located in areas remote from locations where they are desired as fuels. Thus, consideration must be given to transporting coal to remote facilities for use as fuel or of relocating those facilities at the site of the coal deposits.

Coal has been transported from one location to another by trains and barges and to a lesser extent by pipelines. Numerous techniques have been described for transporting coal as a slurry or suspension in a carrier liquid through pipelines.

In U.S. Pat. No. 3,637,263 there is described a method of transporting coal wherein an aqueous slurry is formed of a mixture of particulate coal and an inorganic finely divided water insoluble solid carrier having a specific gravity of at least 1.6 and the slurry is pumped through a pipeline. In U.S. Pat. No. 3,129,164 comminuted coal of a size, for example, of 10 to 200 mesh, is slurried in shale oil and the slurry is subjected to pyrolysis to visbreak the shale oil and to release liquid products from the coal.

In U.S. Pat. No. 3,617,095, bulk solids such as bulk chemicals, grains, coal, and ores are transported through a pipeline by being suspended in a pseudo-plastic or thixotropic fluid exhibiting non-Newtonian viscosity properties. It is there said that any thixotropic or pseudo-plastic fluid, such as polymer solutions, gels, and emulsions, with suitable pumping characteristics and which can suspend bulk solids may be used. High internal phase emulsions where the internal phase is a major part of the emulsion were found to be particularly well suited for this use. In Republic of South African Pat. No. 741835, there is disclosed a fuel composition that may be transported through a pipeline. The fuel composition is a combustible slurry including coal and methanol. The coal is in particles of critical and sufficiently small size to tend to remain in suspension in the slurry instead of separating out. In U.S. Pat. No. 3,968,999, there is described a method of transporting a slurry of coal and methanol through pipelines in arctic environments without melting the permafrost of the environment. Methanol is cooled to a temperature of less than 32° F. and particulate coal of a size less than 200 mesh is mixed therewith to form a coal combustible mixture and the coal combustible mixture is pumped through the pipeline. There is described in U.S. Pat. No. 3,926,203 a method of transporting crude oil or tars recovered from arctic areas through a pipeline in the arctic areas in the form of an oil dispersion in a methanol or a methanol-water dispersing medium. Preferably a surface active agent is provided in the oil-methanol or oil-methanol-water systems to better provide a satisfactory dispersion of the oil in the dispersing medium. In a described aspect of the invention, natural gases produced along with the crude oil or otherwise recovered may be converted to methanol for use as a dispersing medium.

In U.S. Pat. No. 3,950,034, there is described a method of pipelining solids by suspending the solids in a liquid containing lamellar micelles and pumping the mixture at flow rates predetermined to produce retroviscous behavior in the liquid at noncryogenic temperatures. The liquid is a composition containing a surfactant, preferably a petroleum sulfonate and at least two substantially immiscible liquids, such as liquid hydrocarbon and water, and optionally up to 20% of a cosurfactant, preferably an alcohol containing 1-20 carbon atoms and/or an electrolyte, preferably an inorganic salt. In U.S. Pat. No. 3,907,134, there is described a substantially water-free, high solid content, stable and combustible fuel slurry that is comprised of solid particulate carbonaceous material, such as powdered coal, a liquid hydrocarbon fuel, such as Bunker C fuel oil, a slurry suspension stabilizing agent, preferably starch, and a viscosity reducing agent, preferably a detergent.

In German Offenlegungsschrift No. 1558969 there is described a method of transporting solid particles through pipes in the form of a suspension in an aqueous carrier liquid, which carrier liquid contains an aromatic hydrocarbon sulfonate and an ethylene oxide polymeride with a high molecular weight for transfer of dilatant properties to the carrier liquid.

In U.S. Pat. No. 4,045,092 there is described a fuel composition that can be transported and stored. The fuel composition is characterized by a combustible, pseudothixotropic liquid-solid suspensoid including a critical proportion of coal particles having a critical settling velocity substantially uniformly dispersed in a solution of methyl fuel including methanol, water and other alcohol-soluble constituents of the coal. Additives may be employed to impart more nearly perfect shear thinning thixotropic rheological characteristics of the liquid-solid suspensoid.

SUMMARY OF THE INVENTION

This invention is directed to a method of transporting particulate solid material as a slurry through a pipeline. A carrier liquid comprised of a solution of alcohol and water in an amount of at least 10 weight percent is provided and an additive is mixed therein to thicken the carrier liquid. The particulate solid material is mixed into the carrier liquid containing the additive to form a pumpable slurry and the slurry is pumped through the pipeline.

DESCRIPTION OF THE PREFERRED EMBODIMENTS

This invention is concerned with a method of transporting particulate solid material as a slurry in an alcohol and water carrier liquid through a pipeline and is particularly concerned with transporting coal as a slurry through a pipeline. More particularly, this invention is concerned with mitigating the problems encountered in transporting particulate coal in slurry form through a pipeline due to the settling of the particulate coal from the slurry.

This invention will be described with reference primarily to transporting coal, but it is to be understood that other particulate solid material, such as other forms of particulate carbonaceous material, such as coke, lignite, and pitch and other particulate material such as ores, which are essentially insoluble in the carrier liquid, may be transported equally well.

In accordance with this invention, there is provided a single phase carrier liquid, which carrier liquid is a solution of alcohol and water wherein the water is present in an amount of at least 10 percent by weight of the solution. An additive is mixed into the carrier liquid to thicken it and particulate coal is mixed therewith to form a pumpable slurry. The slurry is pumped through a pipeline to transport the coal to a desired destination.

The single phase carrier liquid is a solution of alcohol and water wherein water is present in an amount of at least 10 percent by weight of the solution. Methyl alcohol is a preferred alcohol because of its availability or potential availability at coal source locations, though other alcohols may also be used.

Additives suitable for thickening the alcohol and water solution are those additives which require water to be present in the solution to be effective. Examples of suitable additives are hydroxyethylcellulose, carboxymethylhydroxyethylcellulose and polyethylene oxide polymers. Hydroxyethylcellulose is actually a hydroxyethyl ether of cellulose but hereafter will be referred to by the more common name, "hydroxyethylcellulose."

Figure 1:
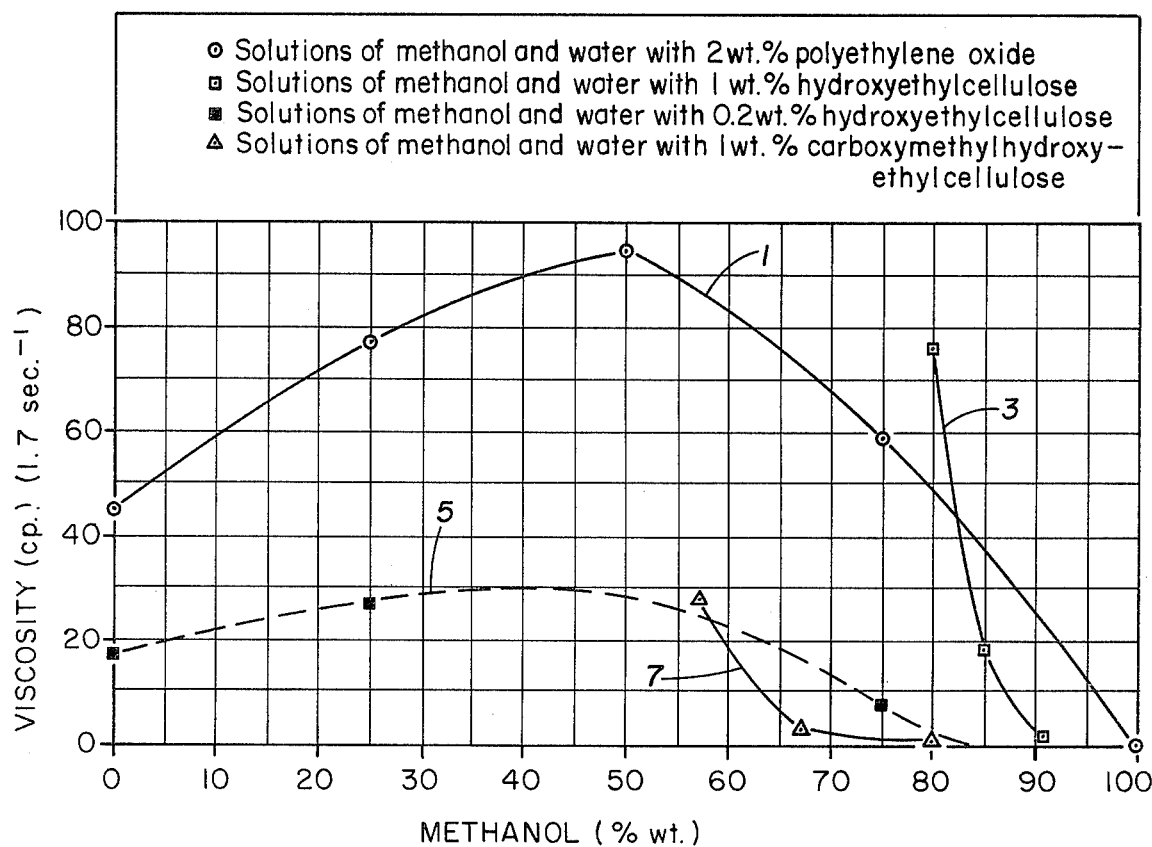
FIG. 1 is a graph showing the relationship of viscosity and methanol content of a methanol and water solution having specified polymer additives included in the solution.
Figure 2:
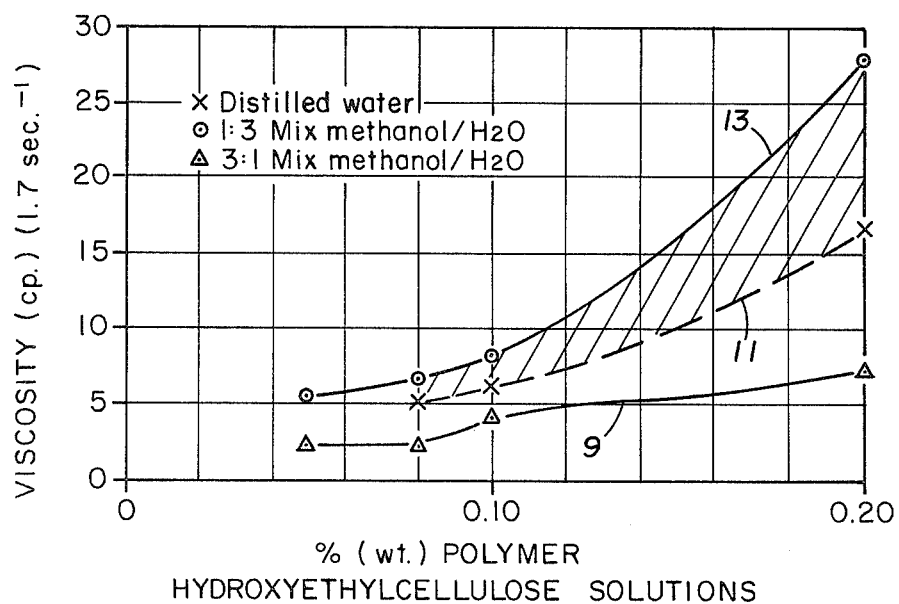
FIG. 2 is a graph showing the relationship of viscosity and polymer concentration in specified solutions.

Laboratory tests have been carried out to further illustrate this invention and the obtained data is shown in FIGS. 1 and 2.

With reference to FIG. 1, there is shown a plot of apparent viscosity in centipoises at 77° F. at a shear rate of 1.7 reciprocal seconds as determined with a Brookfield Viscometer with a UL adapter versus weight percent of methanol in a methanol-water solution. Curve 1 was derived from testing solutions of methanol and water with polyethylene oxide polymers added thereto in an amount of 2 weight percent based on the solution and shows that a maximum viscosity is obtained with solutions formed of about 50 percent methanol and 50 percent water on a weight basis. Curves 3 and 5 were derived from testing solutions of methanol and water with hydroxyethylcellulose added thereto in an amount of 1 weight percent for curve 3 and in an amount of 0.2 weight percent for curve 5 based on this solution. Curve 3 shows a rapid viscosity increase as the water content of the solution increases from 10 weight percent and curve 5 shows a more moderate viscosity increase as the water content increases from 25 weight percent and a moderate viscosity decrease as the water content increases from 75 to 100 weight percent. Curve 7 was derived from testing solutions of methanol and water with carboxymethylhydroxyethylcellulose added thereto in an amount of 1 weight percent based on the solution. This curve 7 shows a rapid viscosity increase as the water content increases from about 33 weight percent, which corresponds to a decrease in methanol content from about 67 weight percent.

The addition of polyethylene oxide, hydroxyethylcellulose and carboxymethylhydroxyethylcellulose polymers into 100 percent methanol resulted in the precipitation of the polymers with no increase in viscosity. The measured viscosity of the methanol after the addition of polymers thereto was about 0.7 centipoise which is essentially the same as the viscosity of the methanol alone. In FIG. 1 only curve 1 is extended to the 100 percent methanol point though curves 3, 5, and 7 likewise could be extended to this same point. Likewise in FIG. 2 no curve is shown for hydroxyethylcellulose in 100 percent methanol inasmuch as this curve would essentially be a straight line paralleling the X-axis at about the 0.7 centipoise level.

In FIG. 2 there is shown a plot of apparent viscosity in centipoises at 77° F. at a shear rate of 1.7 reciprocal seconds as determined with a Brookfield Viscometer with a UL adapter versus weight percent of polymer wherein the polymer is hydroxyethylcellulose. Curve 9 represents a solution of hydroxyethylcellulose in a solution of 3 parts of methanol to 1 part of water; curve 11 represents a solution of hydroxyethylcellulose in distilled water; and curve 13 represents a solution of hydroxyethylcellulose in a solution of 1 part of methanol to 3 parts of water. This figure demonstrates the surprising results that: the addition of a polymer to 100% methanol produces no viscosity increase (not shown but previously discussed), the addition of a polymer to distilled water produces some viscosity increase (curve 11), the addition of a polymer to a solution of 3 parts methanol to 1 part water produces a less viscosity increase than does the addition of the polymer to distilled water (curve 9), but the addition of a polymer to a solution of 1 part methanol to 3 parts water produces a greater viscosity increase than resulted from the addition of a polymer to water alone (curve 13). This enhanced viscosity yield obtained by adding hydroxyethylcellulose to a 1 to 3 mixture, 25 percent methanol, 75 percent water, of methyl alcohol and water is illustrated by the crosshatched area of FIG. 2.

Suitable polymers which are soluble in alcohol-water solutions and which will, when dissolved therein, increase the viscosity thereof are listed below along with a supplier thereof.

| | |
|---|---|
| Hydroxyethyl ether of cellulose | Hercules Powder Co. |
| Cellulose mixed ethers | Hercules Powder Co. |
| Nonionic cellulose ethers | Hercules Powder Co. |
| Alkylene oxide derivatives of natural gums | Stein Hall Powder Co. |
| High molecular weight homologs of polyethylene oxide | Union Carbide |
| Neutral salts of lightly crosslinked carboxyvinyl polymers | B. F. Goodrich |
| Carboxymethylhydroxyethyl-cellulose | Hercules Powder Co. |

A suitable concentration of these additives for use in alcohol-water solutions wherein the water content varies within the range of about 10 to 75 weight percent of the solution is an amount within the range of about 0.10 to 7.5 weight percent of the solution.

In forming a slurry in accordance with this invention, a solution of alcohol and water is provided as a carrier liquid wherein water is present in the solution in an amount of at least 10 weight percent and desirably within the range of about 10 to 75 weight percent. A suitable additive is mixed with the alcohol and water solution in an amount of at least 0.10 weight percent and desirably within the range of 0.10 to 7.5 weight percent to thicken the alcohol-water carrier liquid. Particulate solid material such as particulate coal is mixed with the thickened alcohol and water carrier liquid to form a pumpable slurry and the slurry is pumped through a pipeline to transport the particulate solid material to a desired location. The particulate solid material is provided of a size which will essentially be maintained in suspension in the thickened alcohol-water solution. In the before-mentioned U.S. Pat. No. 4,045,092, combustible carbonaceous particles were suspended in a methyl fuel in a proportion of 50 to 80 percent by weight and were sized and shaped to have a settling velocity in water of less than 2½ centimeters per second. Coal was reduced in size to pass through an 8 mesh Tyler Standard Screen and have a majority of the particles that would pass through a 100 mesh screen. Because of the excellent suspending properties of the present carrier liquid, the size of the particulate particles to be transported is not critical though, of course, they must be of a size that can be suspended and pumped in a slurry.

In accordance with an embodiment of this invention, there is provided a solution of alcohol having 1 to 4 carbon atoms and water in an amount of at least 10 weight percent of the solution and at least 0.10 weight percent of an additive selected from the group consisting of hydroxyethylcellulose, carboxymethylhydroxyethylcellulose and polyethylene oxide is mixed therewith to thicken the solution. Particulate solid material is mixed with the thickened alcohol-water solution to form a pumpable slurry and the slurry is pumped through a pipeline. In accordance with another embodiment, the alcohol is methanol, the additive is hydroxyethylcellulose and water is present in the alcohol-water solution in an amount within the range of about 15 to 75 weight percent. In accordance with still another embodiment, the alcohol is methanol, the additive is carboxymethylhydroxyethylcellulose and water is present in the alcohol-water solution in an amount within the range of about 35 to 75 weight percent of the solution. In accordance with a further embodiment, the alcohol is methanol, the additive is polyethylene oxide and water is present in the alcohol-water solution in an amount of about 50 weight percent of the solution.

What is claimed is:

1. A method of transporting particulate solid material as a slurry through a pipeline, comprising the steps of:
   (a) providing a carrier liquid comprised of a solution of alcohol and water, said water being present in an amount within the range of 10 to 75 weight percent of said solution;
   (b) mixing an additive into said carrier liquid in an amount of at least 0.10 weight percent of said solution of thicken said carrier liquid;
   (c) mixing particulate solid material into said carrier liquid containing said additive to form a pumpable slurry; and
   (d) pumping said slurry through said pipeline.

2. The method of claim 1 wherein said additive is selected from the group consisting of hydroxymethylcellulose, carboxymethylhydroxyethylcellulose, and polyethylene oxide and mixtures thereof and wherein said particulate solid material is particulate coal.

3. The method of claim 2 wherein said alcohol is methanol, said water in said alcohol and water solution is present in an amount within the range of about 15 to 75 weight percent of said solution, and said additive is hydroxyethylcellulose.

4. The method of claim 3 wherein said water in said alcohol and water solution is present in an amount of about 75 weight percent of said solution.

5. The method of claim 2 wherein said alcohol is methanol, said water in said alcohol and water solution is present in an amount within the range of about 35 to 75 weight percent based on said solution, said additive is carboxymethylhydroxyethylcellulose.

6. The method of claim 2 wherein said alcohol is methanol, said water in said alcohol and water solution is present in an amount of about 50 weight percent of said solution, and said additive is polyethylene oxide.

* * * * *